(12) United States Patent
Kosako et al.

(10) Patent No.: US 7,711,184 B2
(45) Date of Patent: *May 4, 2010

(54) IMAGE DISPLAY METHOD, IMAGE DISPLAY PROGRAM, AND IMAGE DISPLAY APPARATUS

(75) Inventors: Tatsuo Kosako, Takatsuki (JP); Ai Tsukada, Ibaraki (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/330,069

(22) Filed: Dec. 8, 2008

(65) Prior Publication Data

US 2009/0091586 A1   Apr. 9, 2009

Related U.S. Application Data

(62) Division of application No. 10/890,260, filed on Jul. 14, 2004, now Pat. No. 7,463,767.

(30) Foreign Application Priority Data

Sep. 10, 2003   (JP)   ............................. 2003-318666

(51) Int. Cl.
    *G06K 9/00*   (2006.01)
(52) U.S. Cl. ...................................... 382/162; 382/233
(58) Field of Classification Search ................ 362/162, 362/168, 232, 233, 305; 707/3; 386/106
    See application file for complete search history.

(56) References Cited

U.S. PATENT DOCUMENTS

| 6,335,742 | B1 * | 1/2002 | Takemoto ................... 715/781 |
| 6,701,011 | B1 * | 3/2004 | Nakajima ................... 382/167 |
| 7,164,846 | B2 * | 1/2007 | Ohta et al. ................... 386/95 |
| 2007/0104459 | A1 * | 5/2007 | Ohta et al. ................... 386/95 |

FOREIGN PATENT DOCUMENTS

| JP | 10-243323 | 9/1998 |
| JP | 11-313316 | 11/1999 |
| JP | 2000-184395 | 6/2000 |
| JP | 2002-027400 | 1/2002 |
| JP | 2002-199345 | 7/2002 |

OTHER PUBLICATIONS

Japanese Notice of Reasons for Rejection issued in Patent Application No. JP 2003-318666 dated on Jul. 4, 2008.

* cited by examiner

*Primary Examiner*—Duy M Dang
(74) *Attorney, Agent, or Firm*—McDermott Will & Emery LLP

(57) ABSTRACT

An image display method by which a presence of a variation in a color signal in video, a variation in brightness data in video, a bit rate of video reproduction, an audio signal, a variation in a bit rate of video reproduction, or caption data is checked, whereby it is possible to display a significant image whose contents can be grasped by a user by skipping over a monochrome image such as a black or white image whose contents cannot be grasped by the user, even if a moving image starts from such a monochrome image.

4 Claims, 14 Drawing Sheets

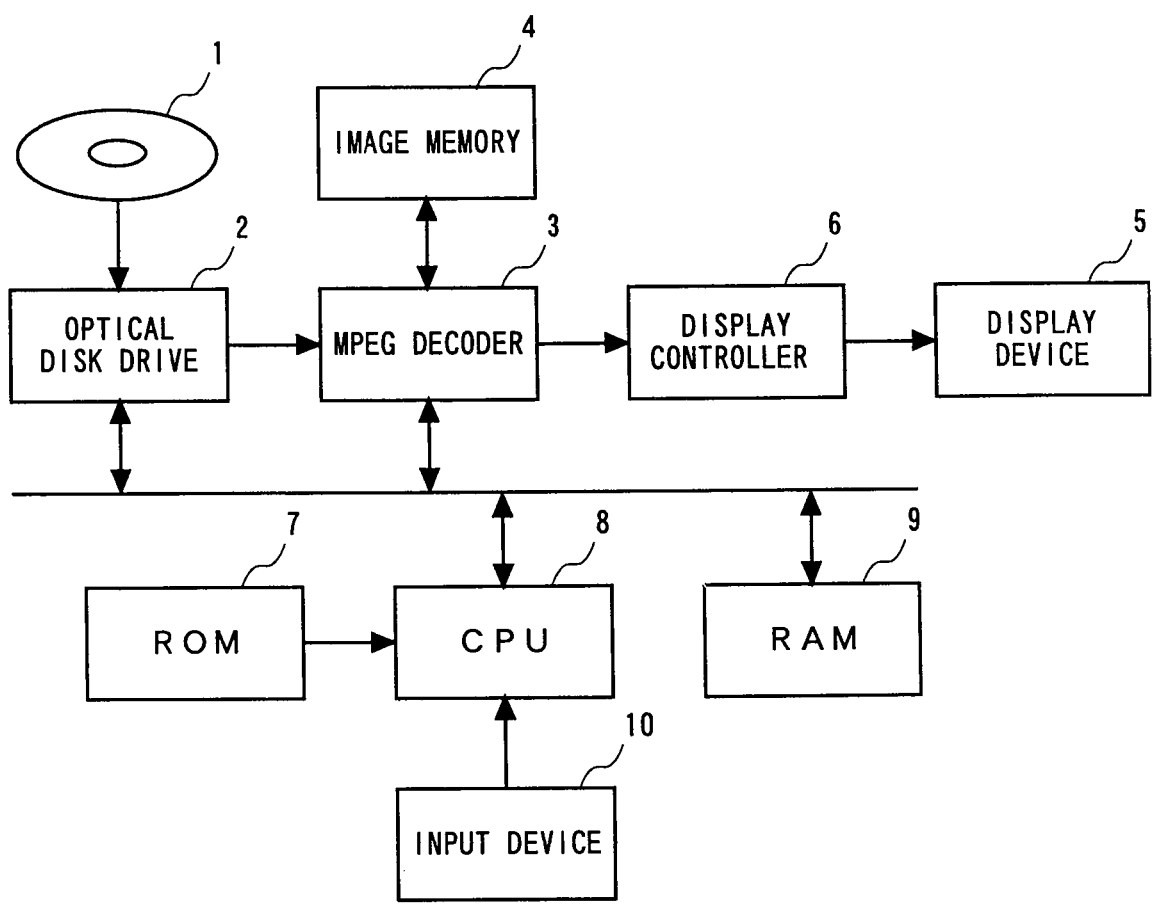
F I G. 1

F I G. 1 3  PRIOR ART

IMAGE DISPLAY METHOD, IMAGE DISPLAY PROGRAM, AND IMAGE DISPLAY APPARATUS

RELATED APPLICATIONS

This application is a Divisional of U.S. application Ser. No. 10/890,260, filed Jul. 14, 2004, now U.S. Pat. No. 7,463,767, claiming priority of Japanese Application No. 2003-318666, filed Sep. 10, 2003, the entire contents of each of which are hereby incorporated by reference.

BACKGROUND OF THE INVENTION

1. Field of the Invention

The present invention relates to an image display method. More particularly, the present invention relates to an image display method for displaying a digest of a moving image.

2. Description of the Background Art

When the contents of a plurality of moving images stored in a video recording medium are checked, it is effective to display a content list (a digest screen) of thumbnail images of the moving images by sequentially reading the stored moving image data.

As one example of the video recording medium, an optical disk will be described.

FIG. 13 is a flowchart for describing a conventional image display method. In FIG. 13, a table stored in a predetermined location on an optical disk is read, and addresses (minute, second, frame) of all moving image data stored in the optical disk are obtained (S1301). Next, a start address of moving image data to be displayed is extracted (S1302), data is read from the optical disk by moving an optical head to a location of the extracted start address (S1303), and the read data is input to an MPEG decoder (S1304). When a frame of an MPEG image is detected in data following the start address, a size of the image data of the frame is reduced (S1305), and a display device is caused to display the resultant thumbnail image (S1306). Such an operation is repeated a predetermined times (e.g., as many as the number of images which can be displayed on the display device) (S1307).

Also, there is a method of detecting audio data and displaying an I picture when a predetermined time period has elapsed after detection of the audio data (Japanese Patent Gazette No. 3110376).

In the above-described conventional image display method, a thumbnail image of an image detected first in data following the start address is displayed. As a result, in the case where a moving image whose screen gradually fades in (as shown in FIG. 14, for example) is included in a video recording medium, a thumbnail image generated from such a moving image is a black image like a thumbnail image 151 shown in FIG. 15. As such, the problem with the above-described conventional image display method is that a user cannot grasp the contents of such a moving image.

Also, there may be a method of detecting brightness of an image for displaying a thumbnail image of a frame when an image whose brightness is equal to or greater than a predetermined level is input. However, a thumbnail image of a moving image which starts from a white (bright) image is plain white, and its content is impossible to understand. As such, a problem with the above-described method is that the user cannot grasp the contents of such a moving image.

Also, by the method of detecting audio data and displaying an I picture when a predetermined time period has elapsed after detection of the audio data, a first image may not be displayed even if the first image of the moving image is a significant image to be displayed. Also, in the case where a video recording medium includes a moving image on which audio data is not multiplexed, a digest (a thumbnail image) of such a moving image is not displayed, which is also a problem.

Therefore, an object of the present invention is to provide an image display method, an image display program, and an image display apparatus capable of displaying a significant thumbnail image by which a user can grasp the contents thereof when a digest of a moving image is displayed.

SUMMARY OF THE INVENTION

The present invention has the following features to solve at least one of the above-described problems (notes in parentheses indicate exemplary elements which can be found in the embodiments to follow, though such notes are not intended to limit the scope of the invention).

A first image display method of the present invention comprises a step (S205) of sequentially extracting image data of each frame from a head of moving image data; a step (S205) of generating thumbnail image data corresponding to the extracted image data; a step (S206) determining whether or not the generated thumbnail image data includes more than a predetermined number of pixels having different color-difference data in a predetermined area; and a step (S208) displaying a thumbnail image corresponding to the thumbnail image data if it is determined that there are more than a predetermined number of pixels having different color-difference data in a predetermined area. Note that "a predetermined area" may be all pixels of the thumbnail image data, or may be a portion of the pixels. Also, "a predetermined number" may be one, or may be two or more.

A second image display method of the present invention comprises: a step (S401) of sequentially extracting image data of each frame from a head of moving image data; a step (S402) of determining whether or not the extracted image data includes more than a predetermined number of pixels having different color-difference data in a predetermined area; a step (S403) of generating thumbnail image data corresponding to the image data if it is determined that there are more than a predetermined number of pixels having different color-difference data in a predetermined area; and a step of displaying a thumbnail image corresponding to the generated thumbnail image data.

A third image display method of the present invention comprises: a step (S502) of sequentially extracting image data of each frame from a head of moving image data; a step (S502) of generating thumbnail image data corresponding to the extracted image data; a step (S503) of determining whether or not there are more than a predetermined number of pixels whose color-difference data is different between the generated thumbnail image data and thumbnail image data corresponding to a preceding frame in a predetermined area; and a step (S504) of displaying a thumbnail image corresponding to the thumbnail image data if it is determined that there are more than a predetermined number of pixels having different color-difference data in a predetermined area. Note that "a preceding frame" may be an immediately preceding frame, or may be a first frame of the moving image data.

A fourth image display method of the present invention comprises: a step (S602) of sequentially extracting image data of each frame from a head of moving image data; a step (S603) of determining whether or not there are more than a predetermined number of pixels whose color-difference data is different between the extracted image data and image data corresponding to a preceding frame in a predetermined area;

a step (S604) of generating thumbnail image data corresponding to the image data if it is determined that there are more than a predetermined number of pixels having different color-difference data in a predetermined area; and a step (S207) of displaying a thumbnail image corresponding to the generated thumbnail image data.

A fifth image display method of the present invention comprises: a step (S205) of sequentially extracting image data of each frame from a head of moving image data; a step (S205) of generating thumbnail image data corresponding to the extracted image data; a step (S701) of determining whether or not the generated thumbnail image data includes more than a predetermined number of pixels having different brightness data in a predetermined area; and a step (S207) of displaying a thumbnail image corresponding to the thumbnail image data if it is determined that there are more than a predetermined number of pixels having different brightness data in a predetermined area. Note that "a predetermined number" may be one, or may be two or more.

A sixth image display method of the present invention comprises: a step of sequentially extracting image data of each frame from ahead of moving image data; a step of determining whether or not the extracted image data includes more than a predetermined number of pixels having different brightness data in a predetermined area; a step of generating thumbnail image data corresponding to the image data if it is determined that there are more than a predetermined number of pixels having different brightness data in a predetermined area; and a step of displaying a thumbnail image corresponding to the generated thumbnail image data.

A seventh image display method of the present invention comprises: a step of sequentially extracting image data of each frame from a head of moving image data; a step of generating thumbnail image data corresponding to the extracted image data; a step of determining whether or not there are more than a predetermined number of pixels whose brightness data is different between the generated thumbnail image data and thumbnail image data corresponding to a preceding frame in a predetermined area; and a step of displaying a thumbnail image corresponding to the thumbnail image data if it is determined that there are more than a predetermined number of pixels having different brightness data in a predetermined area.

An eighth image display method of the present invention comprises: a step of sequentially extracting image data of each frame from a head of moving image data; a step of determining whether or not there are more than a predetermined number of pixels whose brightness data is different between the extracted image data and image data corresponding to a preceding frame in a predetermined area; a step of generating thumbnail image data corresponding to the extracted image data if it is determined that there are more than a predetermined number of pixels having different brightness data in a predetermined area; and a step of displaying a thumbnail image corresponding to the generated thumbnail image data.

A ninth image display method of the present invention comprises: a step (S801) of sequentially extracting image data of each frame from a head of moving image data; a step (S802) of comparing a bit rate of the extracted image data and a predetermined value; a step (S803) of generating thumbnail image data corresponding to the image data if it is determined that a bit rate of the image data exceeds a predetermined value; and a step (S207) of displaying a thumbnail image corresponding to the generated thumbnail image data.

A tenth image display method of the present invention comprises: a step (S903) of sequentially extracting image data of each frame from a head of moving image data; a step (S905) of determining whether or not a difference between a bit rate of the extracted image data and a bit rate of image data of a preceding frame is equal to or greater than a predetermined value; a step (S906) of generating thumbnail image data corresponding to the image data if the difference is equal to or greater than a predetermined value; and a step (S207) of displaying a thumbnail image corresponding to the generated thumbnail image data.

An eleventh image display method of the present invention comprises: a step (S1001) of retrieving audio data included in moving image data from a head of the moving image data; a step (S205) of extracting image data of a frame corresponding to a time period at which the audio data is detected; a step (S205) of generating thumbnail image data corresponding to the extracted image data; and a step (S207) of displaying a thumbnail image corresponding to the generated thumbnail image data.

A twelfth image display method of the present invention comprises: a step (S1101) of retrieving caption data included in moving image data from a head of the moving image data; a step (S205) of extracting image data of a frame corresponding to a time period at which the caption data is detected; a step (S205) of generating thumbnail image data corresponding to the extracted image data; and a step (S207) of displaying a thumbnail image corresponding to the generated thumbnail image data.

An image display program of the present invention causes a computer (8) to execute each step of any of the first to twelfth image display methods.

An image display apparatus of the present invention comprises: recording means (7) for recording the above-described image display program; and a computer (8) operated based on the image display program.

Based on the present invention, when a digest of a moving image is displayed, it is possible to display a significant thumbnail image by which a user can grasp the contents thereof. As a result, the user can easily and reliably grasp the contents of a moving image stored in a video recording medium, for example.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a structure of an image display apparatus according to a first embodiment of the present invention;

DESCRIPTION OF THE PREFERRED EMBODIMENTS

First Embodiment

With reference to the drawings, embodiments of the present invention will be described in detail by taking an optical disk for example.

Figure 2:
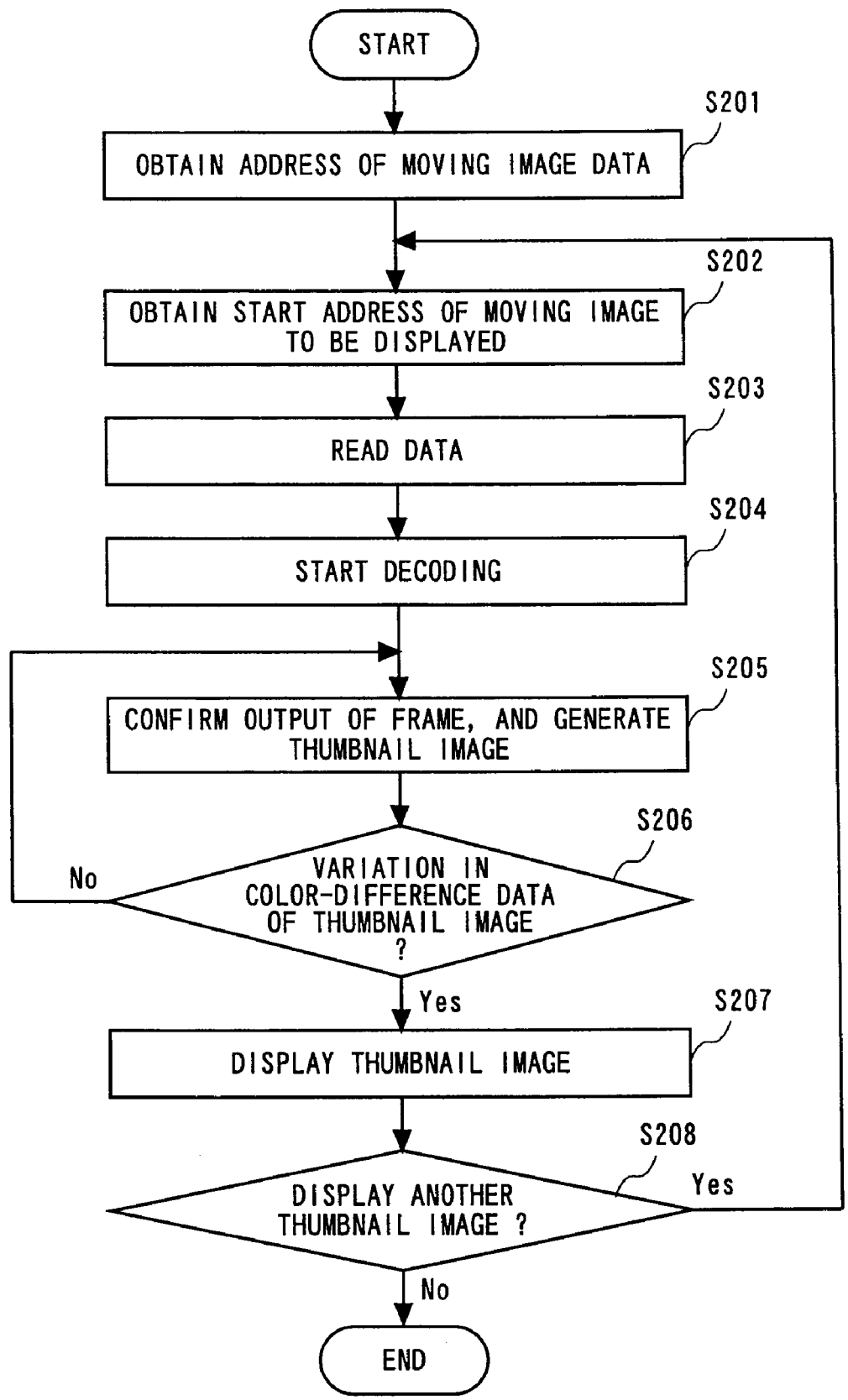
FIG. 2 is a flowchart showing an operation of the image display apparatus according to the first embodiment of the present invention.

FIG. 1 is a block diagram showing a structure of an image display apparatus according to a first embodiment of the present invention. FIG. 2 is a flowchart showing an operation of this image display apparatus. The image display apparatus includes an optical disk drive 2 for reading data from an optical disk 1, an MPEG decoder 3 for decoding MPEG encoded audio data and moving image data, an image memory 4 for storing image data decoded by the MPEG decoder 3, a display controller 6 for causing a display device 5 to display image data stored in the image memory 4, a ROM 7 for storing an image display program, a CPU 8 for controlling the apparatus in accordance with the program, a RAM 9 for storing an address, etc., of moving image data, and an input device 10 used by a user for giving an instruction.

With reference to FIG. 2, an operation of the above-described image display apparatus will be described. First, when the optical disk 1 is mounted on the optical disk drive 2, the CPU 8 causes the optical disk drive 2 to read a table stored in a predetermined location on the optical disk 1. In this table, addresses (minute, second, frame) of all MPEG encoded moving image data stored in the optical disk 1 are registered. Then, the CPU 8 stores the obtained addresses of the moving image data in the RAM 9 (S201).

The CPU 8 retrieves a start address of the moving image data to be displayed from the RAM 9 (S202), reads data from the optical disk 1 by moving an optical head of the optical disk drive 2 to a location of the start address of the moving image data to be displayed on the optical disk 1 (S203), and inputs the read data to the MPEG decoder 3 (S204).

Figure 3A:
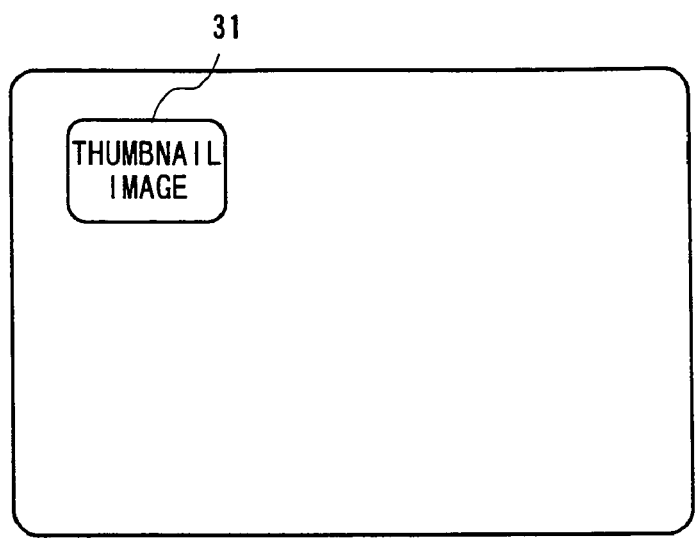
FIGS. 3A to 3C is an exemplary digest screen displayed by the image display apparatus of the present invention.

The MPEG decoder 3 decodes the MPEG encoded data. When an output of a frame following the start address of the moving image data to be displayed is detected, the CPU 8 reduces a size of the image data obtained as a result of decoding by the MPEG decoder 3 (S205), and writes the thumbnail image data generated as a result of a size reduction process to a predetermined memory area in the image memory 4. Further, the CPU 8 compares among color-difference components (color-difference data) of the pixels of the thumbnail image data written to the image memory 4 for determining whether or not there is a variation in the color-difference data (that is, whether or not the thumbnail image data includes pixels having different color-difference data) (S206). If there is no variation in the color-difference data, the CPU goes back to step S205, and performs the same process for a next frame. After repeating the processes at steps S205 and S206, if determination is finally made at step S206 that the thumbnail image data written to the image memory 4 includes pixels having different color-difference data, the CPU 8 instructs the display controller 6 to display a thumbnail image based on the above thumbnail image data on the display device 5 (step S207). As a result, as shown in FIG. 3A, a thumbnail image 31 is displayed on the display device 5.

Figure 3B:
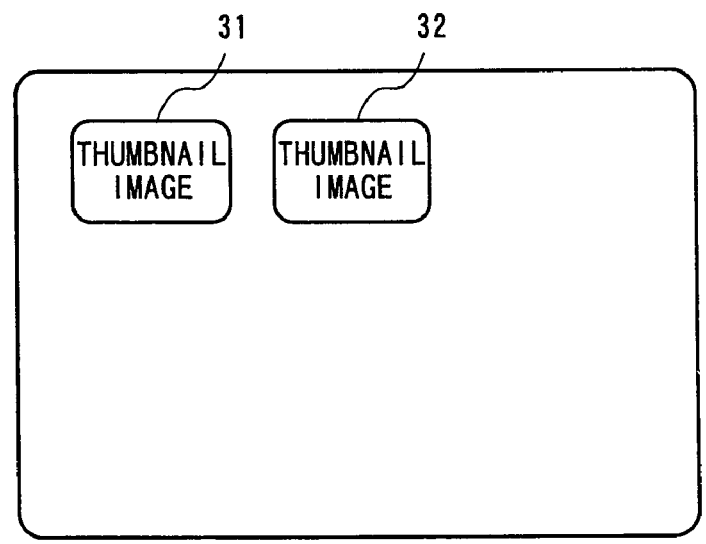

The CPU 8 subsequently determines whether or not another thumbnail image is further displayed by checking, for example, whether or not there is moving image data whose thumbnail image has yet to be displayed in the optical disk 1 (S208). If it is determined that another thumbnail image is to be displayed, the CPU 8 goes back to step S202, and repeats the same process for moving image data to be displayed next. The thumbnail image data obtained by the above process is written to a memory area, which is different from the area to which the thumbnail image 31 was written, in the image memory 4. As a result, as shown in FIG. 3B, a new thumbnail image 32 is displayed next to the thumbnail image 31. By repeating the above-described operation, a digest screen as shown in FIG. 3C in which a plurality of thumbnail images are arranged is displayed.

Figure 3C:
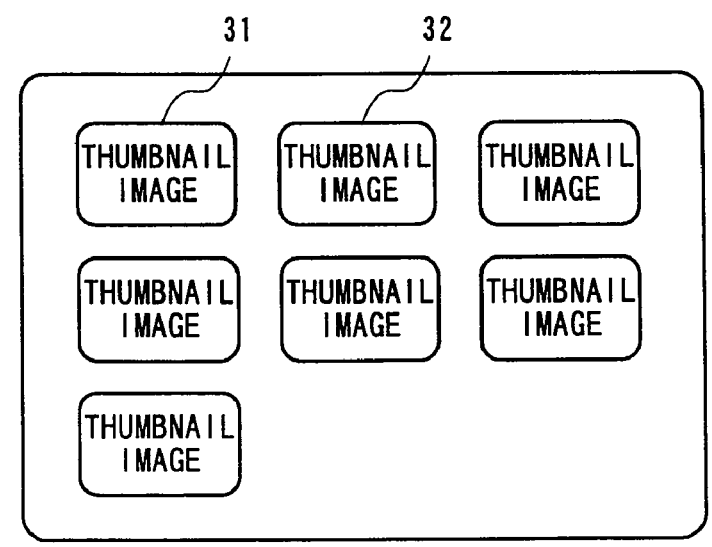

Note that, in FIG. 3C, seven thumbnail images are displayed on the screen, but the present invention is not limited thereto. It will be understood that the number of thumbnail images displayed on the screen may be arbitrary. Also, in the case where the number of thumbnail images generated from the moving image data stored in the optical disk 1 exceeds the maximum number of thumbnail images that can be displayed on one screen (for example, in FIG. 3C, the maximum number is nine), the CPU 8 may newly start displaying after deleting all displayed thumbnail images. Alternatively, the CPU 8 may leave a portion of the displayed thumbnail images, and arrange newly generated thumbnail images next thereto.

Note that, at step S206, determination about whether or not there is a difference in the color-difference component may be made in consideration of all pixels of the thumbnail image. Alternatively, the determination may be made in consideration of a portion of pixels (e.g., pixels near the center of the thumbnail image) of the thumbnail image. If determination is made in consideration of a portion of the pixels, it is possible to reduce the processing load at step S206.

Note that, in the present embodiment, a thumbnail image is displayed if the thumbnail image includes pixels having different color-difference data. However, the present invention is not limited thereto. For example, a thumbnail image may be displayed only in the case where the thumbnail image includes three or more pixels having different color-difference data (that is, in the case where the thumbnail image includes three or more colors). Similarly, a thumbnail image may be displayed only in the case where the thumbnail image includes four or more pixels having different color-difference data. Thus, it is possible to display a further significant thumbnail image.

As such, in the present embodiment, thumbnail images are sequentially generated from a head of the moving image, and a thumbnail image having different color-difference components is displayed as a digest, whereby it is possible to prevent a black or white image from being displayed as a digest. As a result, it is possible to display a significant digest screen allowing the user to easily grasp the contents of the moving image stored in the optical disk 1.

Second Embodiment

Figure 4:
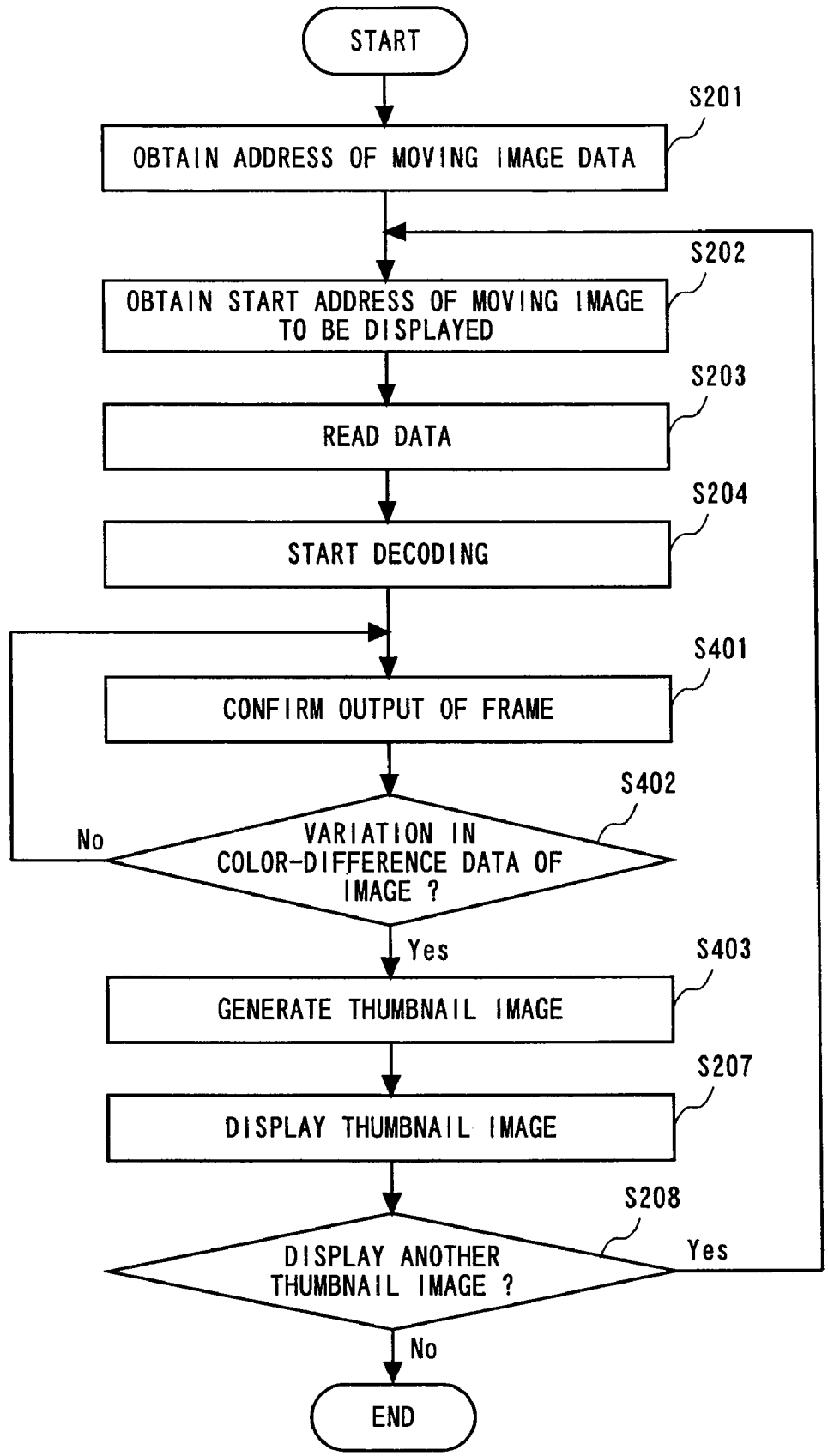
FIG. 4 is a flowchart showing an operation of an image display apparatus according to a second embodiment of the present invention.

FIG. 4 is a flowchart showing an operation of an image display apparatus according to a second embodiment of the present invention. In FIG. 4, any steps identical to their counterparts in FIG. 2 are denoted by like step numbers, with the descriptions thereof omitted. The structure of the image display apparatus of the second embodiment is identical to its counterpart in the first embodiment (in this embodiment, however, the CPU 8 executes a different image processing program), and therefore FIG. 1 is used in the following descriptions.

In the first embodiment, comparison of a color difference is performed by referring to thumbnail image data. The present embodiment is characterized in that comparison of a color difference is performed by referring to image data for which a size reduction process has not been performed.

When an output of a frame following a start address of moving image data to be displayed is detected (S401), the CPU 8 compares a color-difference component of each pixel of the image data of this frame for determining whether or not there is a variation in color-difference data in this image (S402). If there is no variation in the color-difference data, the CPU 8 goes back to step S401, and performs the same process for a next frame. After repeating the processes at steps S401 and S402, if determination is finally made at step S402 that a piece of image data includes pixels having different color-difference data, the CPU 8 reduces a size of the image data (S403), and writes the thumbnail image generated as a result of a size reduction process to a predetermined memory area in the image memory 4. Then, at step S207, a thumbnail image is displayed based on the above-described thumbnail image data.

Note that, at step S402, determination about whether or not there is a difference in the color-difference component may be made in consideration of all pixels of the image. Alternatively, the determination may be made in consideration of a portion of pixels (e.g., pixels near the center of the thumbnail image) of the image. If determination is made in consideration of a portion of the pixels, it is possible to reduce the processing load at step S402.

In the present embodiment, it is assumed that a thumbnail image corresponding to an image including pixels having different color-difference data is displayed. However, the present invention is not limited thereto. For example, only in the case where an image includes three or more pixels having different color-difference data (that is, in the case where the image includes three or more colors), a thumbnail image corresponding to the image may be displayed. Similarly, only in the case where an image includes four or more pixels having different color-difference data, a thumbnail image corresponding to the image may be displayed. Thus, it is possible to display a further significant thumbnail image.

As such, in the present embodiment, an image having different color-difference components is retrieved from a head of the moving image, and a thumbnail image corresponding to the image is displayed as a digest, whereby it is possible to prevent a black or white image from being displayed as a digest. As a result, it is possible to display a digest screen allowing the user to easily grasp the contents of the moving image stored in the optical disk 1.

Note that, compared to the second embodiment, the above-mentioned first embodiment has the following advantages: comparison of a color difference of each pixel requires a smaller processing load since the significance of an image is determined based on a thumbnail image whose size is smaller than an original image; and more precise determination results can be obtained since the significance of an image is determined based on a thumbnail image actually displayed on the screen.

Third Embodiment

Figure 5:
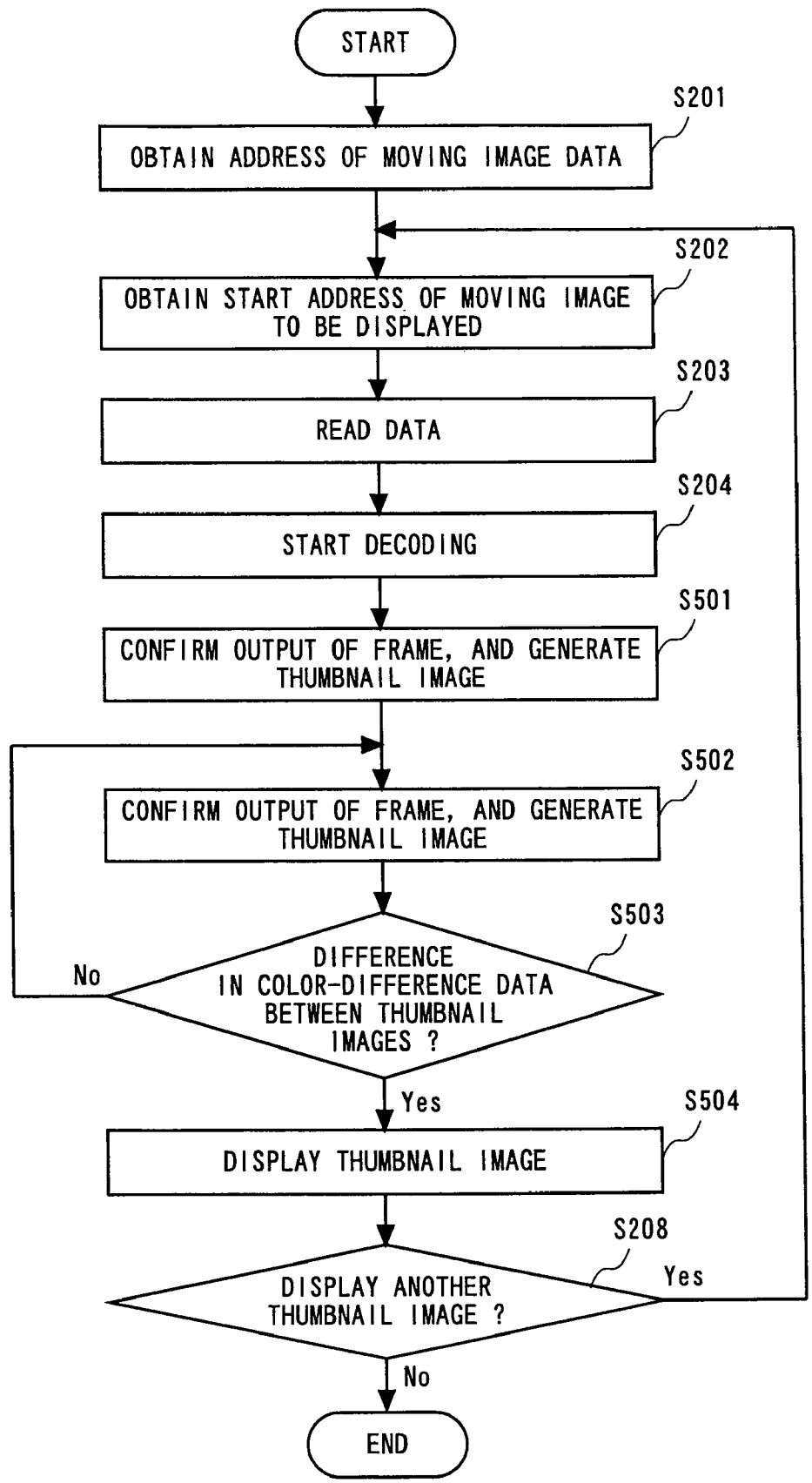
FIG. 5 is a flowchart showing an operation of an image display apparatus according to a third embodiment of the present invention.

FIG. 5 is a flowchart showing an operation of an image display apparatus according to a third embodiment of the present invention. In FIG. 5, any steps identical to their counterparts in FIG. 2 are denoted by like step numbers, with the descriptions thereof omitted. The structure of the image display apparatus of the third embodiment is identical to its counterpart in the first embodiment (in this embodiment, however, the CPU 8 executes a different image processing program), and therefore FIG. 1 is used in the following descriptions.

In the first embodiment, a color difference is compared among pixels of the same thumbnail image data. The present embodiment is characterized in that a color difference is compared between two pieces of thumbnail image data on a pixel basis.

When an output of a frame following a start address of moving image data to be displayed is detected, the CPU 8 reduces a size of the image data obtained as a result of decoding by the MPEG decoder 3 (S501), and writes the thumbnail image data (that is, thumbnail image data corresponding to a first frame; hereinafter, referred to as first thumbnail image data) generated as a result of a size reduction process to a predetermined memory area in the image memory 4. Further, the CPU 8 detects an output of a next frame, performs a size reduction process for image data of this frame, and writes the thumbnail image data (hereinafter, referred to as second thumbnail image data) generated as a result of a size reduction process to a predetermined memory area in the image memory 4 (S502). Subsequently, the CPU 8 compares a color-difference component (color-difference data) between the first thumbnail image data and the second thumbnail image data on a pixel basis for determining whether or not there is a difference in the color-difference data (that is, there is a pixel whose color-difference data is different between the first thumbnail image data and the second thumbnail image data) (S503). If there is no difference in the color-difference data, the CPU 8 goes back to step S502, and performs the same process using thumbnail image data of a next frame as second thumbnail image data. After repeating the processes at steps S502 and S503, if determination is finally made at step S503 that there is a pixel whose color-difference data is different between the first thumbnail image data and the second thumbnail image data, the CPU 8 instructs the display controller 6 to display a thumbnail image based on the second thumbnail image data on the display device 5 (S504).

Note that, at step S503, determination about whether or not there is a difference in the color-difference component may be made in consideration of all pixels of each thumbnail image data. Alternatively, the determination may be made in consideration of a portion of pixels (e.g., pixels near the center of the thumbnail image) of each thumbnail image data. If determination is made in consideration of a portion of the pixels, it is possible to reduce the processing load at step S503.

Also, in the present embodiment, a thumbnail image of a first frame is used as first thumbnail image data. However, the present invention is not limited thereto. For example, a thumbnail image of a frame immediately before the second thumbnail image data may be sequentially used as first thumbnail image data for comparing a color-difference component between the frame and a next frame.

As such, in the present embodiment, first thumbnail image data whose color-difference component is different from thumbnail image data of ahead of the moving image is retrieved, and a thumbnail image corresponding to the thumbnail image data is displayed as a digest, whereby it is possible to prevent a black or white image from being displayed as a digest. As a result, it is possible to display a significant digest screen allowing the user to easily grasp the contents of the moving image stored in the optical disk 1.

Fourth Embodiment

Figure 6:
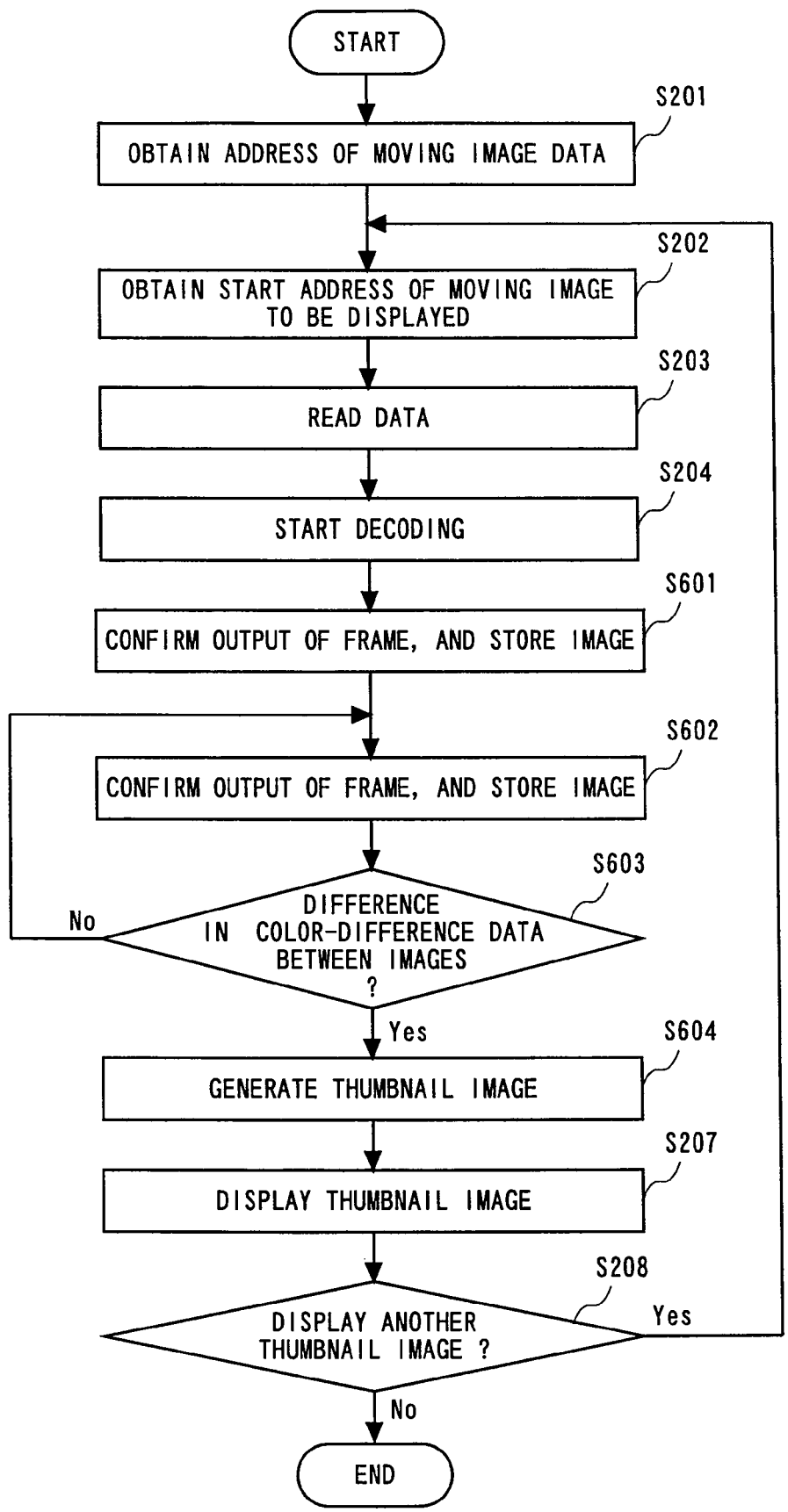
FIG. 6 is a flowchart showing an operation of an image display apparatus according to a fourth embodiment of the present invention.

FIG. 6 is a flowchart showing an operation of an image display apparatus according to a fourth embodiment of the present invention. In FIG. 6, any steps identical to their counterparts in FIG. 2 are denoted by like step numbers, with the descriptions thereof omitted. The structure of the image display apparatus of the fourth embodiment is identical to its counterpart in the first embodiment (in this embodiment, however, the CPU 8 executes a different image processing program), and therefore FIG. 1 is used in the following descriptions.

In the third embodiment, comparison of a color difference is performed by referring to two pieces of thumbnail image data. The present embodiment is characterized in that comparison of a color difference is performed by referring to two pieces of image data for which a size reduction process has not been performed.

When an output of a frame following a start address of the moving image data to be displayed is detected, the CPU 8 writes the image data (that is, image data corresponding to a first frame; hereinafter, referred to as first image data) obtained as a result of decoding by the MPEG decoder 3 to a predetermined memory area in the image memory 4 (S601). Further, the CPU 8 detects an output of a next frame, and writes this image data (hereinafter, referred to as second image data) to a predetermined memory area in the image memory 4 (S602). Subsequently, the CPU 8 compares a color-difference component (color-difference data) between the first image data and the second image data, which are written to the image memory 4, on a pixel basis for determining whether or not there is a difference in the color-difference data (that is, there is a pixel whose color-difference data is different between the first image data and the second image data (S603). If there is no difference in the color-difference data, the CPU 8 goes back to step S602, and performs the same process using image data of a next frame as second image data. After repeating the processes at steps S602 and S603, if determination is finally made at step S603 that there is a pixel whose color-difference data is different between the first image data and the second image data, the CPU 8 reduces a size of the second image data (S604), and writes the thumbnail image data generated as a result of a size reduction process to a predetermined memory area in the image memory 4. Then, at step S207, a thumbnail image is displayed based on the above-described thumbnail image data.

Note that, at step S603, determination about whether or not there is a difference in the color-difference component may be made in consideration of all pixels of each image data. Alternatively, the determination may be made in consideration of a portion of pixels (e.g., pixels near the center of the image) of each image data. If determination is made in consideration of a portion of the pixels, it is possible to reduce the processing load at step S603.

Also, in the present embodiment, an image of a first frame is used as first image data. However, the present invention is not limited thereto. For example, a thumbnail image of a frame immediately before the second image data may be sequentially used as first image data for comparing a color-difference component between the frame and a next frame.

As such, in the present embodiment, first image data whose color-difference component is different from image data of a head of the moving image is retrieved, and a thumbnail image corresponding to the image data is displayed as a digest, whereby it is possible to prevent a black or white image from being displayed as a digest. As a result, it is possible to display a significant digest screen allowing the user to easily grasp the contents of the moving image stored in the optical disk 1.

Note that, compared to the fourth embodiment, the above-mentioned third embodiment has the following advantages: comparison of a color difference of each pixel requires a smaller processing load since the significance of an image is determined based on a thumbnail image whose size is smaller than an original image; and more precise determination results can be obtained since the significance of an image is determined based on a thumbnail image actually displayed on the screen.

Fifth Embodiment

In the above-described first to fourth embodiments, determination about whether or not an image is significant is made based on a color difference. In place of color difference data, it is also effective to determine whether or not an image is significant based on brightness. In this case, "a color difference" in the first to fourth embodiments may be replaced with "brightness" for describing an operation of the image processing apparatus. By way of example, "a color difference" in the first embodiment is replaced with "brightness" for describing the first embodiment as a fifth embodiment.

Figure 7:
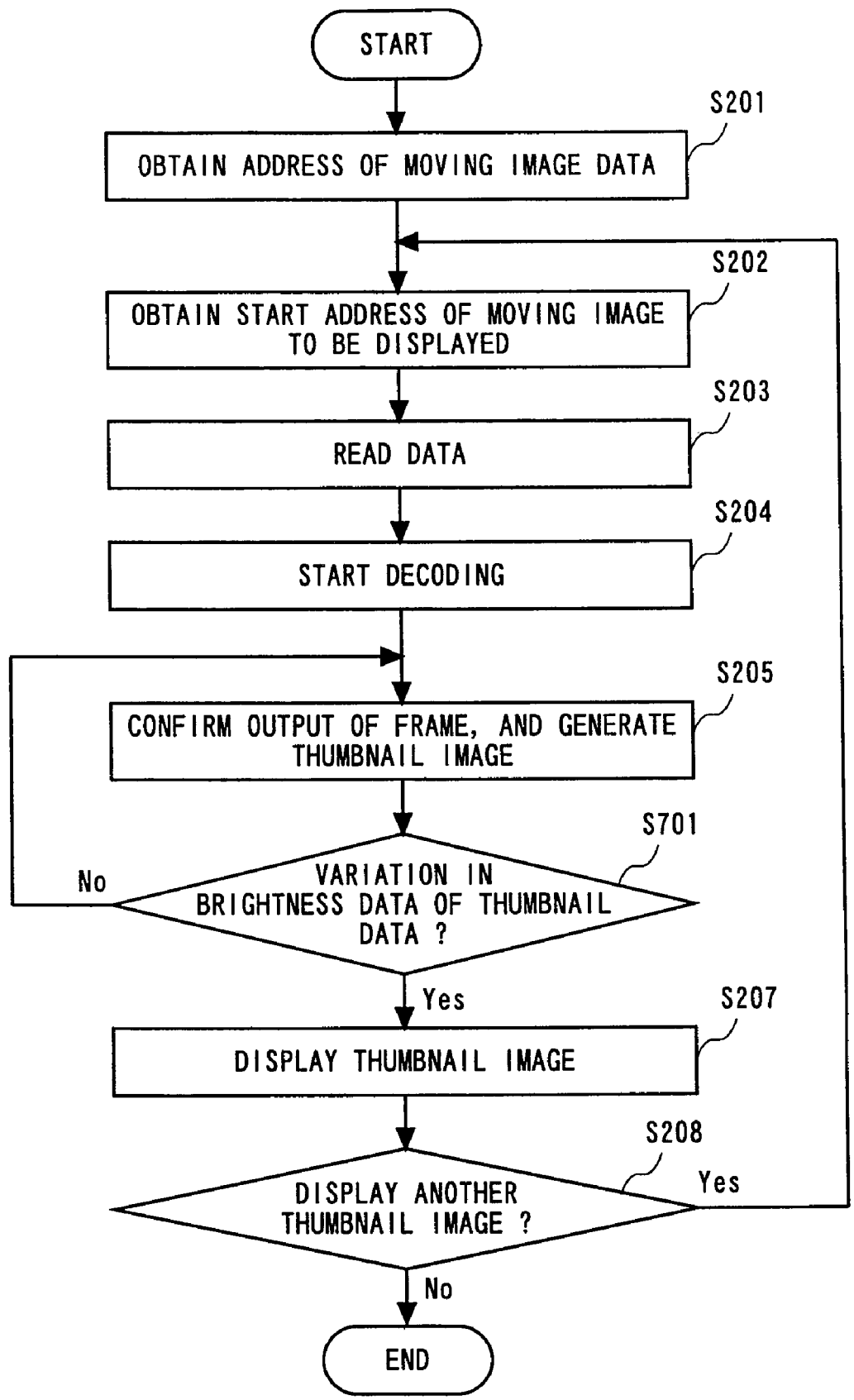
FIG. 7 is a flowchart showing an operation of an image display apparatus according to a fifth embodiment of the present invention.

FIG. 7 is a flowchart showing an operation of an image display apparatus according to the fifth embodiment of the present invention. In FIG. 7, any steps identical to their counterparts in FIG. 2 are denoted by like step numbers, with the descriptions thereof omitted. The structure of the image display apparatus of the fifth embodiment is identical to its counterpart in the first embodiment (in this embodiment, however, the CPU 8 executes a different image processing program), and therefore FIG. 1 is used in the following descriptions.

The CPU 8 compares among brightness components (brightness data) of the pixels of the thumbnail image data written to the image memory 4 for determining whether or not there is a variation in the brightness data (that is, whether or not the thumbnail image data includes pixels having different brightness data) (S701). If there is no variation in the brightness data, the CPU goes back to step S205, and performs the same process for a next frame. After repeating the processes at steps S205 and S701, if determination is finally made at step S701 that the thumbnail image data written to the image memory 4 includes pixels having different brightness data, the CPU 8 instructs the display controller 6 to display a thumbnail image based on the above thumbnail image data on the display device 5 (step S207).

Note that, at step S701, determination about whether or not there is a difference in the brightness component may be made in consideration of all pixels of the thumbnail image. Alternatively, the determination may be made in consideration of a portion of pixels (e.g., pixels near the center of the thumbnail image) of the thumbnail image. If determination is made in consideration of a portion of the pixels, it is possible to reduce the processing load at step S701.

Note that, in the present embodiment, a thumbnail image is displayed if the thumbnail image includes pixels having different brightness data. However, the present invention is not limited thereto. For example, a thumbnail image may be displayed only in the case where the thumbnail image includes three or more pixels having different brightness data. Similarly, a thumbnail image may be displayed only in the case where the thumbnail image includes four or more pixels having different brightness data. Thus, it is possible to display a further significant thumbnail image.

As such, in the present embodiment, a thumbnail image is sequentially generated from a head of the moving image, and a thumbnail image having different brightness components is displayed as a digest, whereby it is possible to prevent a black or white image from being displayed as a digest. As a result, it is possible to display a significant digest screen allowing the user to easily grasp the contents of the moving image stored in the optical disk 1.

Note that "a color difference" in the second to fourth embodiments can be replaced with "brightness" in similar manners. In this case, a structure and an operation of the image processing apparatus would be obvious over the descriptions of each embodiment.

Sixth Embodiment

Figure 8:
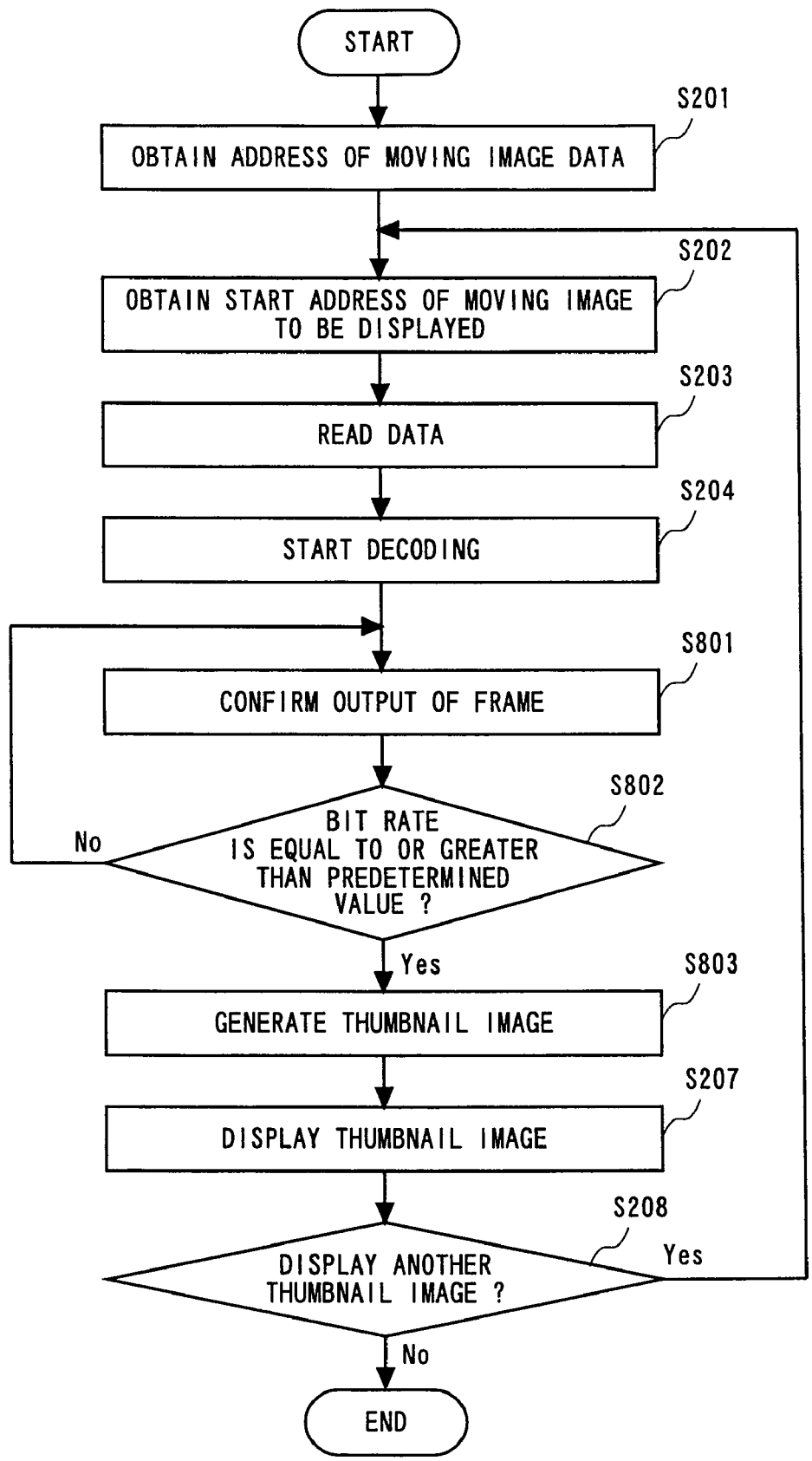
FIG. 8 is a flowchart showing an operation of an image display apparatus according to a sixth embodiment of the present invention.

FIG. 8 is a flowchart showing an operation of an image display apparatus according to a sixth embodiment of the present invention. In FIG. 8, any steps identical to their counterparts in FIG. 2 are denoted by like step numbers, with the descriptions thereof omitted. The structure of the image display apparatus of the sixth embodiment is identical to its counterpart in the first embodiment (in this embodiment, however, the CPU 8 executes a different image processing program), and therefore FIG. 1 is used in the following descriptions.

When an output of a frame following a start address of the moving image data to be displayed is detected (S801), the CPU 8 calculates a bit rate of the image data obtained as a result of decoding by the MPEG decoder 3, and determines whether or not the calculated bit rate is equal to or greater than a predetermined value (S802). If the calculated bit rate is smaller than a predetermined value (that is, the image is a monotonous image), the CPU 8 goes back to step S801 for checking an output of a next frame and calculating a bit rate of the next frame. The CPU 8 repeats the above-described process. When image data whose bit rate is equal to or greater than a predetermined value is detected, the CUP 8 reduces a size of the image data, and writes the thumbnail image data to a predetermined memory area in the image memory 4 (S803). Then, at step S207, a thumbnail image is displayed based on the above-described thumbnail image data.

As such, in the present embodiment, a frame whose bit rate is equal to or greater than a predetermined value is retrieved from ahead of the moving image, and the retrieved frame is displayed as a digest, whereby it is possible to prevent a black or white image from being displayed as a digest. As a result, it is possible to display a significant digest screen allowing the user to easily grasp the contents of the moving image stored in the optical disk 1.

Seventh Embodiment

Figure 9:
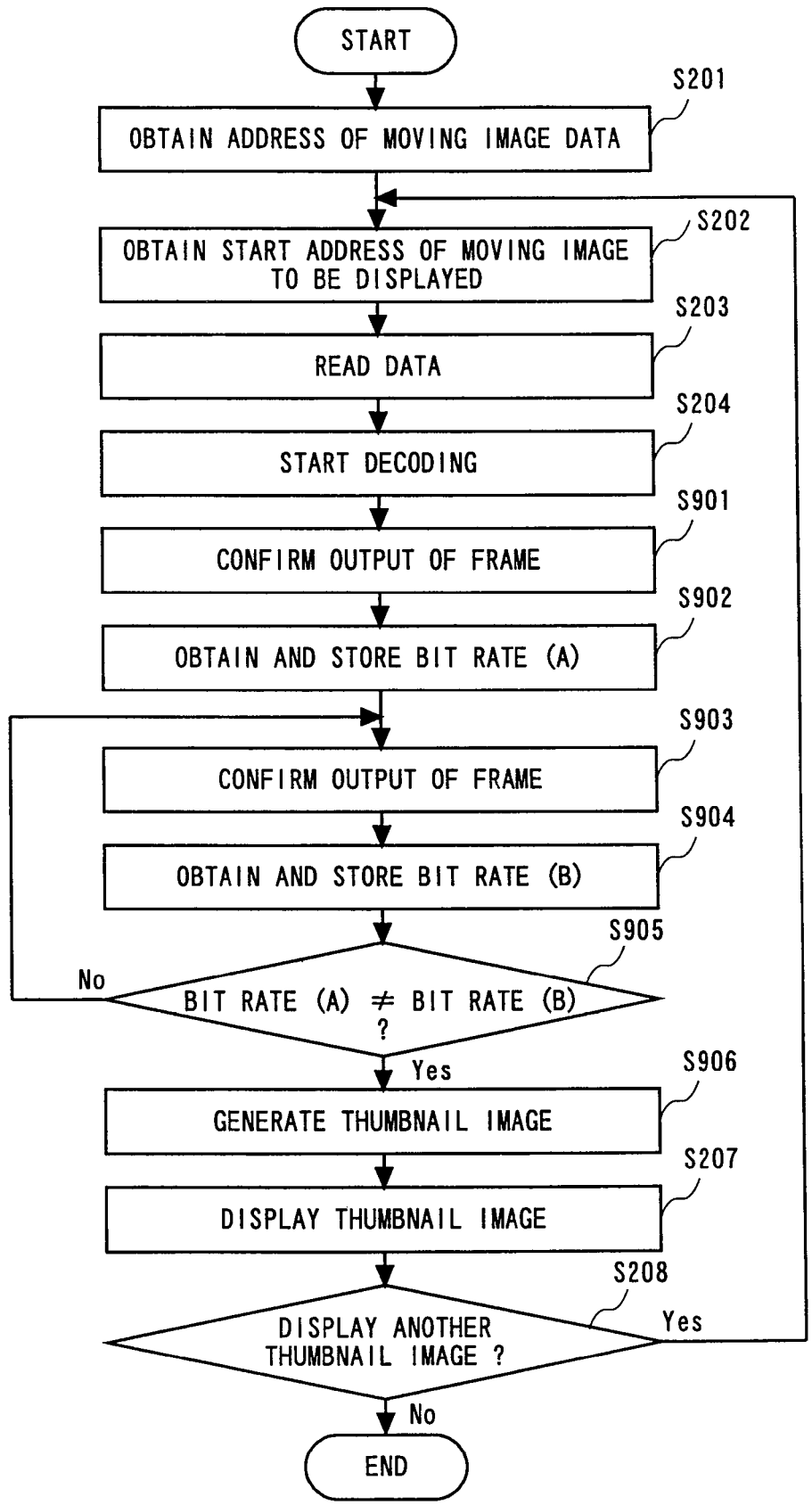
FIG. 9 is a flowchart showing an operation of an image display apparatus according to a seventh embodiment of the present invention.

FIG. 9 is a flowchart showing an operation of an image display apparatus according to a seventh embodiment of the present invention. In FIG. 9, any steps identical to their counterparts in FIG. 2 are denoted by like step numbers, with the descriptions thereof omitted. The structure of the image display apparatus of the seventh embodiment is identical to its counterpart in the first embodiment (in this embodiment, however, the CPU 8 executes a different image processing program), and therefore FIG. 1 is used in the following descriptions.

When an output of a frame following a start address of the moving image data to be displayed is detected (S901), the CPU 8 calculates a bit rate of the image data (which corresponds to a first frame) obtained as a result of decoding by the MPEG decoder 3, and stores the calculated bit rate (S902). Assume that the above-described bit rate is (A). Further, the CPU 8 detects an output of a next frame (S903), calculates a bit rate of image data (hereinafter, referred to as second image data) of this frame, and stores the calculated bit rate (S904). Assume that the above-described bit rate is (B). Then, the CPU 8 determines whether or not the bit rate (A) is equal to the bit rate (B) (S905). If the bit rate (A) is equal to the bit rate (B), the CPU 8 goes back to step S903, and performs the same process using a bit rate of a next frame as a bit rate (B). After repeating the processes from steps S903 to S905, if a frame having a different bit rate is finally detected, the CPU 8 reduces a size of image data of the frame (S906). Then, at step S207, a thumbnail image is displayed based on the above-described thumbnail image data.

Note that, in the present embodiment, the CPU 8 determines at step S905 whether or not a bit rate (A) is equal to a bit-rate (B), but the present invention is not limited thereto. For example, the CPU 8 may determine whether or not a difference between the bit rate (A) and the bit rate (B) is equal to or greater than a predetermined value.

Also, in the present embodiment, a bit rate of a first frame is used as a bit rate (A), but the present invention is not limit thereto. For example, a bit rate of a frame immediately before the second image data may be used as a bit rate (A) for performing comparison of a bit rate between the frame and a next frame.

As such, in the present embodiment, a frame having a changed bit rate is retrieved from a head of the moving image, and the retrieved frame is displayed as a digest, whereby it is possible to prevent a black or white image from being displayed as a digest. As a result, it is possible to display a significant digest screen allowing the user to easily grasp the contents of the moving image stored in the optical disk 1.

Eighth Embodiment

Figure 10:
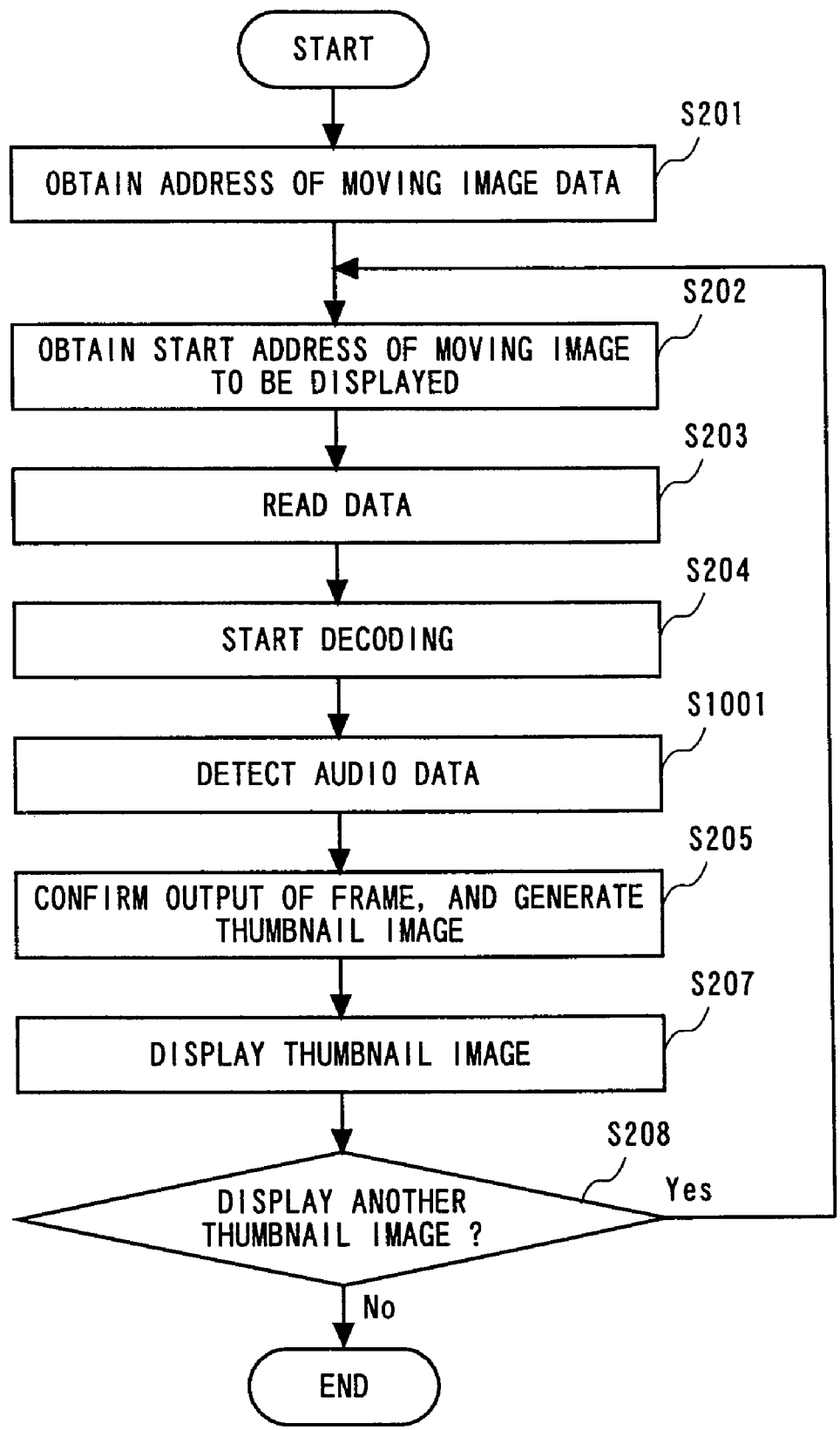
FIG. 10 is a flowchart showing an operation of an image display apparatus according to an eighth embodiment of the present invention.

FIG. 10 is a flowchart showing an operation of an image display apparatus according to an eighth embodiment of the present invention. In FIG. 10, any steps identical to their counterparts in FIG. 2 are denoted by like step numbers, with the descriptions thereof omitted. The structure of the image display apparatus of the eighth embodiment is identical to its counterpart in the first embodiment (in this embodiment, however, the CPU 8 executes a different image processing program), and therefore FIG. 1 is used in the following descriptions.

When an MPEG encoded audio data is detected in data following a start address (S1001), the CPU 8 detects an output of a frame after a time period represented by an address of the detected audio data, reduces a size of the frame (S205), and writes the thumbnail image data to a predetermined memory area in the image memory 4. Then, at step S207, a thumbnail image is displayed based on the above-described thumbnail image data.

As such, in the present embodiment, a frame after a time period at which audio data is first detected is retrieved from a head of a moving image, and the retrieved frame is displayed as a digest, whereby it is possible to prevent a screen corresponding to a silent frame from being displayed as a digest. As a result, it is possible to display a significant digest screen allowing the user to easily grasp the contents of the moving image stored in the optical disk 1.

Ninth Embodiment

Figure 11:
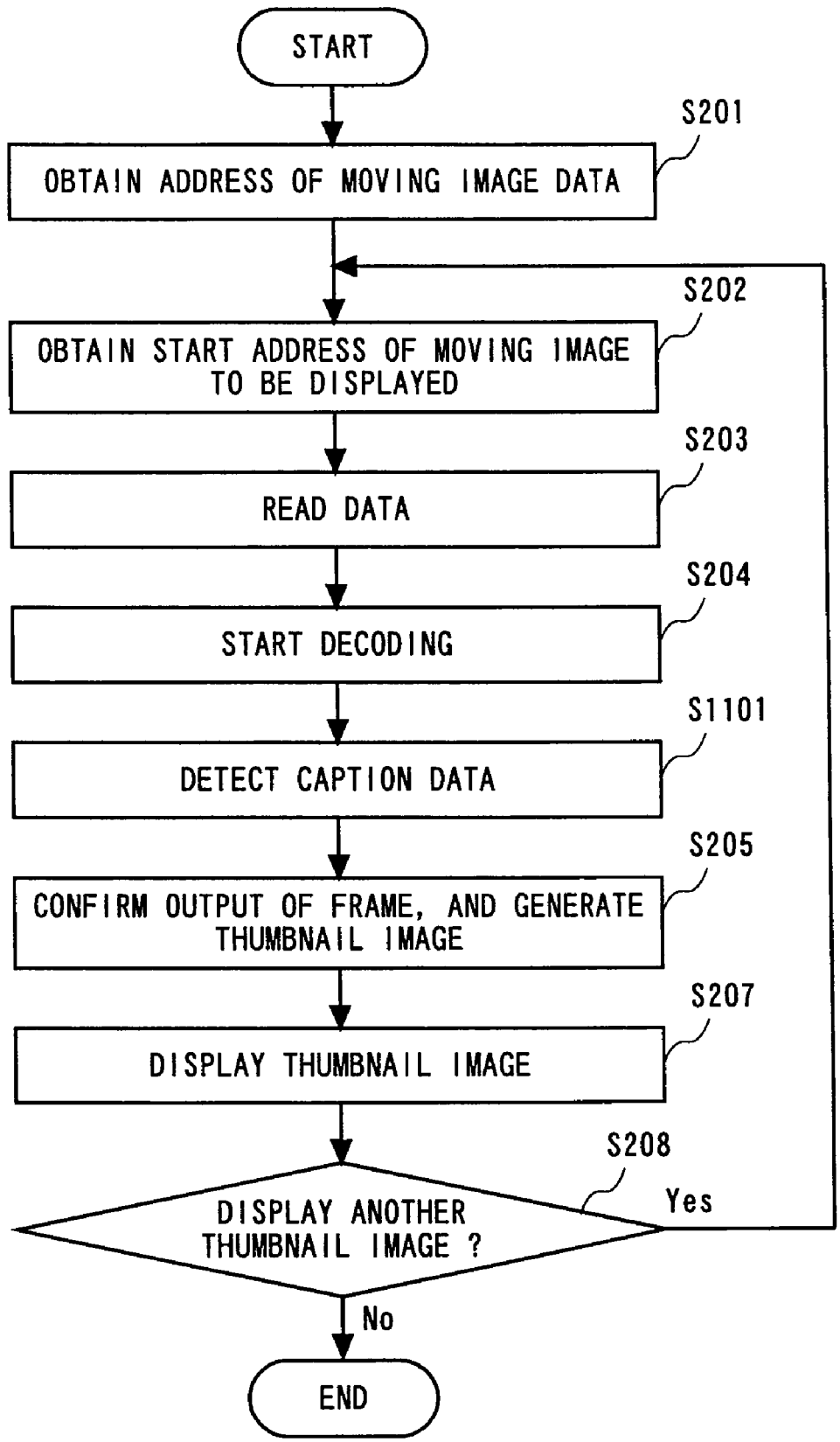
FIG. 11 is a flowchart showing an operation of an image display apparatus according to a ninth embodiment of the present invention.

FIG. 11 is a flowchart showing an operation of an image display apparatus according to a ninth embodiment of the present invention. In FIG. 11, any steps identical to their counterparts in FIG. 2 are denoted by like step numbers, with the descriptions thereof omitted. The structure of the image display apparatus of the ninth embodiment is identical to its counterpart in the first embodiment (in this embodiment, however, the CPU 8 executes a different image processing program), and therefore FIG. 1 is used in the following descriptions.

When MPEG encoded caption data is detected in data following a start address (S1101), the CPU 8 detects a frame after a time period represented by an address of the detected caption data, reduces a size of the frame (S205), and writes the thumbnail image data to a predetermined memory area in the image memory 4. Then, at step S207, a thumbnail image is displayed based on the above-described thumbnail image data.

As such, in the present embodiment, a frame after a time period at which caption data is detected is retrieved from a head of a moving image, and the retrieved frame is displayed as a digest, whereby it is possible to prevent a screen corresponding to a frame without speech in the moving image with the captions from being displayed as a digest. As a result, it is possible to display a significant digest screen allowing the user to easily grasp the contents of the moving image stored in the optical disk 1.

Tenth Embodiment

Figure 12:
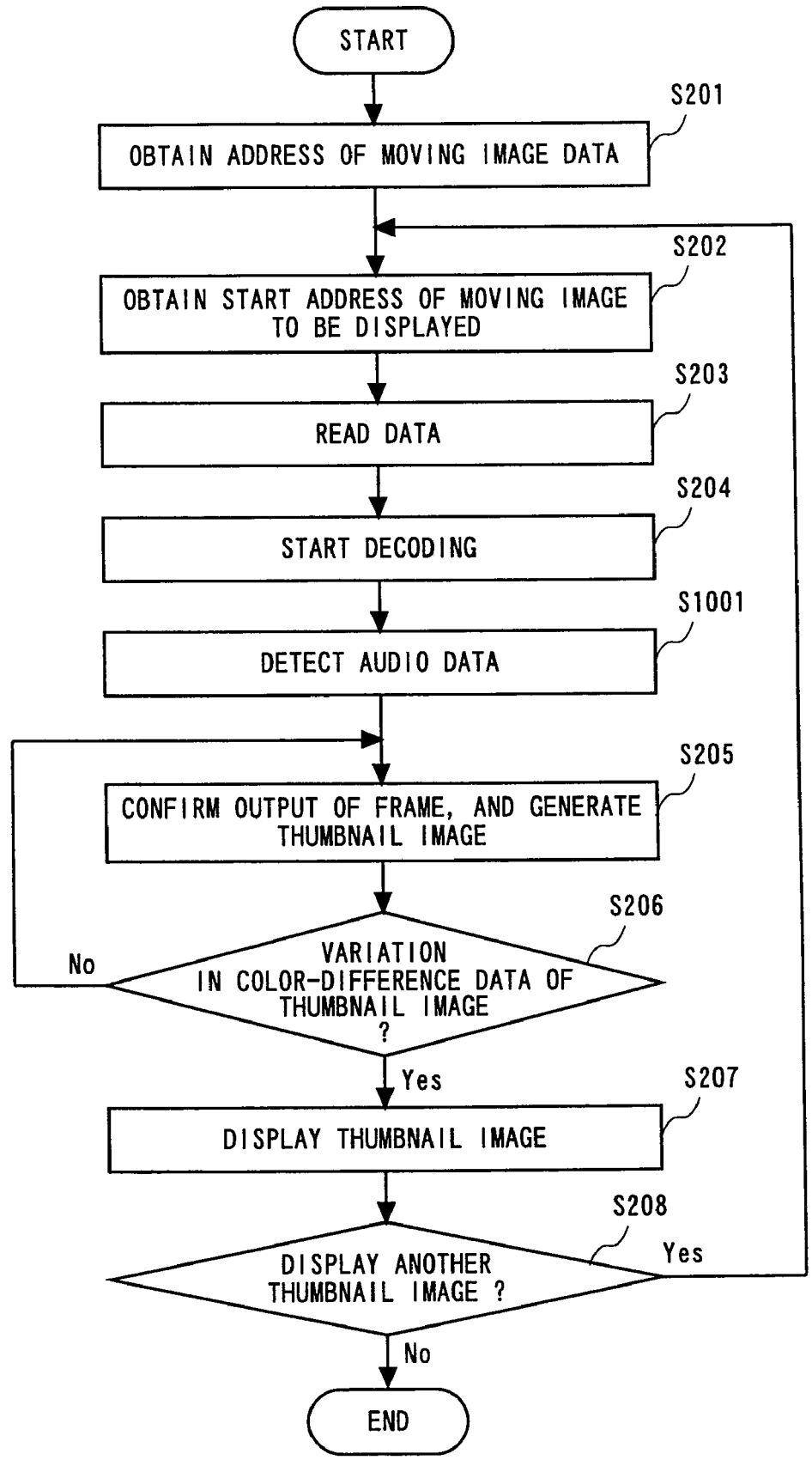
FIG. 12 is a flowchart showing an operation of an image display apparatus according to a tenth embodiment of the present invention.
Figure 13:
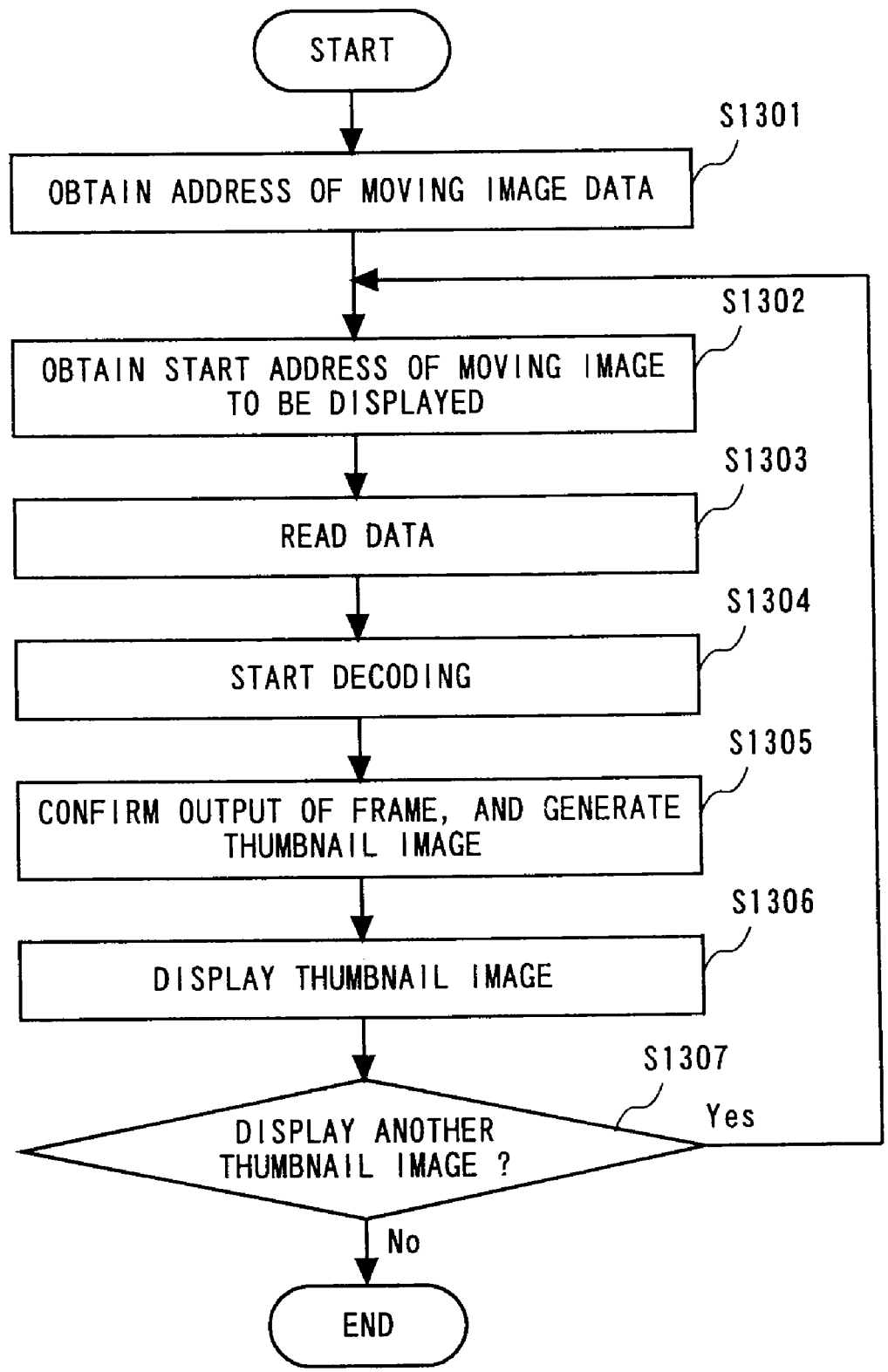
FIG. 13 is a flowchart showing an operation of a conventional image display apparatus.
Figure 14:
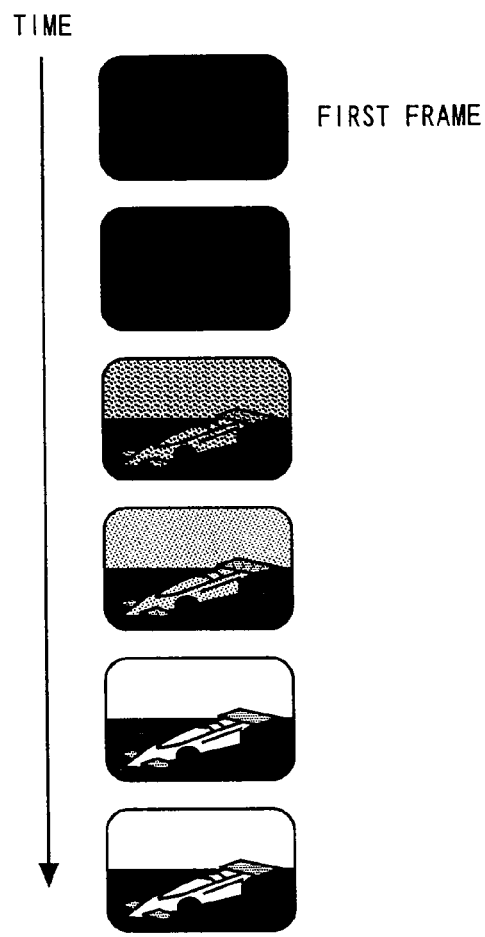
FIG. 14 is an example of moving image data.
Figure 15:
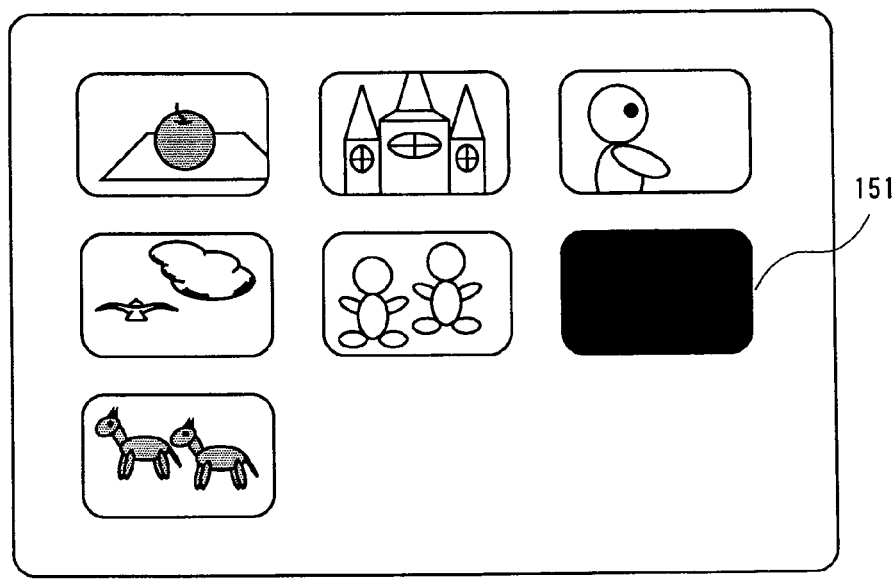
FIG. 15 is an exemplary digest screen displayed by the conventional image display apparatus.

FIG. 12 is a flowchart showing an operation of an image display apparatus according to a tenth embodiment of the present invention. In FIG. 12, any steps identical to their counterparts in FIG. 2 are denoted by like step numbers, with the descriptions thereof omitted. The structure of the image display apparatus of the tenth embodiment is identical to its counterpart in the first embodiment (in this embodiment, however, the CPU 8 executes a different image processing program), and therefore FIG. 1 is used in the following descriptions.

The present embodiment corresponds to a combination of the above-described first embodiment and the eighth embodiment.

When an MPEG encoded audio data is detected in data following a start address (S1001), the CPU 8 detects an output of a frame after a time period represented by an address of the detected audio data, reduces a size of the frame (S205), and writes the thumbnail image data to a predetermined memory area in the image memory 4. Subsequently, the CPU 8 compares among color-difference components of the pixels of the thumbnail image written to the image memory 4 for checking whether or not there is a variation in the color-difference data (S206). If there is no variation in the color-difference data, the CPU 8 goes back to step S205. After repeating the processes at steps S205 and S206, the CPU 8 instructs the display controller 6 to display a thumbnail image including pixels having different color-difference data (step S207).

As such, in the present embodiment, a plurality of methods for detecting a significant thumbnail image are combined, whereby it is possible to display a further significant thumbnail image. Also, a process for generating a thumbnail image can be omitted until detection of audio data, whereby it is possible to reduce time required for retrieving a significant thumbnail image.

Note that the tenth embodiment is a combination of the first embodiment and the eighth embodiment, but a combination is not limited thereto. For example, three or more embodiments may be combined.

Note that, in the above-described first to tenth embodiments, a digest of MPEG encoded moving image data stored in the optical disk 1 is displayed, but the present invention is not limited thereto. For example, the present invention can be applied to a case in which a digest of moving image data stored in a recording medium other than the optical disk 1 (e.g., a hard disk) is displayed. Also, the present invention can be applied to a case in which a digest of moving image data other than MPEG encoded moving image data is displayed.

Also, in the above-described first to tenth embodiments, an image processing program is stored in the ROM 7. The image processing program may be stored in an arbitrary computer readable recording medium such as a CD-ROM or a hard disk, or may be supplied to the image processing apparatus via a communication line.

Note that, in the first to tenth embodiments, a significant image is detected from a start address of each moving image. However, the present invention is not limited thereto. An address may be detected from a start address in reverse. As a result, in the case where the moving image is reproduced from the detected image, it is possible to reproduce desired data without skipping a start address thereof.

While the invention has been described in detail, the foregoing description is in all aspects illustrative and not restrictive. It is understood that numerous other modifications and variations can be devised without departing from the scope of the invention.

What is claimed is:

1. An image display method for displaying a digest of a moving image, comprising the steps of:
   sequentially extracting image data of each frame of moving image data;
   determining, using a processor, whether or not there are more than a predetermined number of pixels whose color-difference data is different between the extracted image data and image data corresponding to a preceding frame;
   generating, using a processor, thumbnail image data corresponding to the extracted image data if it is determined that there are more than a predetermined number of pixels having different color-difference data; and
   displaying a thumbnail image corresponding to the generated thumbnail image data.

2. An image display method for displaying a digest of a moving image, comprising the steps of:
   sequentially extracting image data of each frame from a head of moving image data;
   determining, using a processor, whether or not there are more than a predetermined number of pixels whose color-difference data is different between the extracted image data and image data corresponding to a preceding frame in a predetermined area;
   generating, using a processor, thumbnail image data corresponding to the extracted image data if it is determined that there are more than a predetermined number of pixels having different color-difference data in a predetermined area; and displaying a thumbnail image corresponding to the generated thumbnail image data.

3. The image display method according to claim 1, wherein the step of determining whether or not there are more than the predetermined number of pixels whose color-difference data is different between the extracted image data and image data corresponding to the preceding frame on a pixel-by-pixel.

4. The image display method according to claim 2, wherein the step of determining whether or not there are more than the predetermined number of pixels whose color-difference data is different between the extracted image data and image data corresponding to the preceding frame on a pixel-by-pixel.

* * * * *